United States Patent [19]

Hatanaka et al.

[11] 4,256,616
[45] Mar. 17, 1981

[54] PLATINUM COMPLEXES FOR SILICONE COMPOSITIONS

[76] Inventors: Masayuki Hatanaka, 91-8, Shin-Nakano, Ohra-machi, Ohra-gun, Gumma-ken; Shigeru Nagashima, 1550, Menuma-machi, Ohsato-gun, Saitama-ken, both of Japan

[21] Appl. No.: 962,869

[22] Filed: Nov. 22, 1978

[51] Int. Cl.³ .............................................. C08L 91/00
[52] U.S. Cl. .............................. 260/18 S; 252/429 R; 252/431 C; 252/431 P; 525/478; 528/15; 528/18; 528/31; 528/32

[58] Field of Search ...................... 528/15, 18, 31, 32; 260/18 S; 525/428; 252/429 R, 431 P, 431 C

[56] References Cited

U.S. PATENT DOCUMENTS 4,108,833  8/1978  Hatanaka ........................... 528/15

Primary Examiner—Melvyn I. Marquis

[57] ABSTRACT

Platinum catalyzed SiH-Olefin silicone compositions are disclosed, wherein the catalyst is a zero-valent platinum-phosphorus complex, which may be combined with stannous salts.

6 Claims, No Drawings

PLATINUM COMPLEXES FOR SILICONE COMPOSITIONS

BACKGROUND OF THE INVENTION

This invention concerns catalytic compositions suitable for a hydrosilylation of polyorganosiloxane, particularly catalytic compositions suitable for crosslinking reaction of addition-reaction type silicone elastomers.

It is known that catalysts of the platinum group have, conventionally, been used for hydrosilylation reactions, that is, the addition-reaction between compounds with an aliphatic unsaturated bond and compounds with a Si—H bond. They are also known to be effective as curing catalysts for so called addition-reaction type polysiloxane compositions which are composed of polyorganosiloxane with an olefin aliphatic unsaturated bond and polyorganosiloxane with a Si—H bond, and which forms a polyorganosiloxane elastomer with a network structure by hydrosilylation reaction between the two siloxanes. These platinum catalysts have the following advantages: (1) curing reaction time is extremely short; (2) a small amount of catalyst is effective, and only a minute amount of catalyst or its decomposed product remains in the product obtained.

These platinum catalysts, however, may cause instability in the products containing them due to their ability to promote the addition-reaction referred to previously at normal temperatures. This imposes considerable limits on fabrications requiring storage time between processes or time for freshening, extrusion, or insertion into a mold after the catalyst is added and before curing. This has been the limiting factor in using the addition-reaction type polysiloxanes employing platinum catalysts, especially when they are used in the same application as heat-vulcanizing type silicone rubber using conventional organic peroxides as catalysts. Many methods have been suggested which aim at inhibiting the activity of a catalyst at room temperatures. There are methods, for example, to add acetylene compounds (Japanese Pat. No. 31476 issued 1969,), nitrile compounds (Japanese Pat. No. 22018 issued 1970,), and sulfur compounds (Japanese Pat. No. 1116 issued 1972,) as inhibitors to platinum catalysts such as platinic hydrochloride Control of the amount of inhibitor to be added, however, is delicate, and an excess amount leads to insufficient curing and too small an amount leads to an insufficient inhibiting effect on catalytic activity, which hampers the stability of the compositions. Further, there are some types of inhibitors whose effect is weakened as a result of evaporation during storage, or the heat resistance or electrical properties of the silicone rubber obtained are adversely affected by the inhibitor which remains after curing. The method using a divalent platinum-phosphorus complex (Japanese Pat. No. 19193 issued 1969,) does not produce a sufficient inhibiting effect. The use of a zero valent platinum-phosphorus complex have a superior inhibiting effect, (Japan Patent lay-opened 1976, No. 139853) but their practical application is limited due to their instability against oxygen and heat, which requires special precautions during storage and use; long storage at a temperature over 40° C. must especially be avoided. This invention eliminates these limitations on the practical application of platinum catalysts and provides a catalyst composition which has stability, and long storage, the present invention provides good catalytic compositions suitable for a hydrosilylation reaction of polyorganosiloxane and is, especially suitable for a crosslinking reaction of addition-reaction type silicone rubber compositions.

SUMMARY OF THE INVENTION

This invention concerns catalytic compositions for a hydrosilylation reaction of a polyorganosiloxane composed of stannous salt and a zero valent platinum-phosphorus complex expressed in the general formula: $(R^1R^2R^3P)_4Pt$ wherein the formula, $R^1$, $R^2$, and $R^3$ are monovalent groups selected from identical or different substituted or unsubstituted hydrocarbon groups and hydrocarbonoxy groups.

DESCRIPTION OF THE PREFERRED EMBODIMENT

Zero valent platinum-phosphorus complexes used in this invention are expressed in the general formula: $(R^1R^2R^3P)_4Pt$.

Examples are:
$[(CH_3)_3P]_4Pt$
$[(C_4H_9)_3P]_4Pt$
$[(C_6H_5)_3P]_4Pt$
$[(CH_3O)_3P]_4Pt$
$[(C_4H_9O)_3P]_4Pt$
$[(C_6H_5O)_3P]_4Pt$
$[(ClC_6H_4O)_3P]_4Pt$
$[(p\text{-}Cl.C_6H_4)_3P]_4Pt$
$(p\text{-}Cl.C_6H_4)_3P[(C_6H_5O)_3P]_3Pt$
$(C_6H_5)_3P[(p\text{-}Cl.C_6H_4O)_3P]_3Pt$
$[(C_2H_5)_2(C_6H_5)P]_4Pt$
$[(C_2H_5O)_2(C_6H_5O)P]_4Pt$
$[(C_6H_5)_2(C_2H_5O)P]_4Pt$
$[(CH_3)_2(C_2H_5O)P]_4Pt$
$[(CH_3)_2(C_4H_9O)P]_4Pt$
$[(C_6H_5)_3P]_3Pt$
$[(C_6H_5O)_3P]_3Pt$ Particularly $[(C_6H_5)_3P]_4Pt$ and $[(C_6H_5O)_3P]_4Pt$ are recommendable, because of the easy availability of raw materials and simple synthesis. The most commonly used stannous salts are stannous halides and stannous carboxylates. Examples of the former are hydrate of stannous chloride, especially dihydrates, and stannous bromide and its hydrates. Examples of the latter are stannous octoate, stannous oleate, stannous maleate, etc. Addition of 10 weight percent of the above-mentioned stannous salts to a zero-valent platinum-phosphorus complex in a catalyzed composition effectively inhibits any oxygen or heat induced changes in the zero-valent platinum-phosphorus complex. Addition of more stannous salt provides inhibition at room temperature and allows longer storage. The stabilizing effect of the stannous salt observed at room temperature is lost at a temperature above 60° C. and especially above 130° C., and the addition-reaction is catalyzed to a final state. The quantity of stannous salt to be added to obtain catalytic compositions which can serve as a stabilizing function at room temperature and have a good curing property at increasing temperatures to addition-reaction type polysiloxane compositions depends on the application of the catalytic composition and therefore vary within a wide range. Adding an insufficient quantity of stannous salt to the zero valent platinum-phosphorus complex, however, results in poor stability of the zero valent platinum-phosphorus complex and also of the addition-reaction type polysiloxane compounds at room temperature. On the other hand, an excess amount unduly slows down the curing speed during heating. But when the objective is to produce addition-reaction type silicone rubber using polyorganosiloxane containing a vinyl group of over 2,000 polymerization degrees as its base, the preferable range of quantity of stannous salt to be added is 0.1 to 20 parts by weight to 1 part by weight of the zero valent platinum-phosphorus complex. The range of 0.3 to 2 parts by weight is particularly desirable to ensure a curing time of 5 to 20 minutes, which is necessary to allow for proper time for processing when, for example, silicone rubber compositions are used in the extrusion process.

The catalytic compositions of this invention can be prepared by directly mixing stannous salt with the zero valent platinum-phosphorus complex, but each can also be dissolved in appropriate solvents before mixing. Linear and cyclic ethers and polyethers are good solvents for this purpose.

The addition of the catalytic compositions of the present invention to an addition-reaction type of polysiloxane can be facilitated by adding stable liquid polyorganosiloxanes or by forming a paste by adding inorganic fine powder. For the inorganic fine powder, fine silica, both surface-treated and non-treated, is used. Trimethylsilyl group endblocked polydimethylsiloxanes and polymethylphenylsiloxanes are commonly used as polyorganosiloxanes.

The catalytic compositions of this invention can be mixed with either polydiorganosiloxane having an aliphatic unsaturated bond such as vinyl group wherein the other organo groups are selected from the group consisting of monovalent hydrocarbon radicals and halogenated hydrocarbon radicals and having a viscosity varying from 500 to 300,000,000 centipoise at 25° C. or a polyorganosiloxane with a Si—H bond and the mixture then is combined with the other polyorganosiloxane. The organo groups in the silicon-bonded-hydrogen-containing polysiloxane are selected from monovalent hydrocarbon radicals and the polysiloxane has a viscosity varying from 5 to 5,000 centipoise at 25° C. The catalytic composition can also be added to the mixture of the two polyorganosiloxanes. Its quantity is not specified since it varies with the purpose of the reaction and with the processing conditions selected. For addition-reaction type silicone rubber, however, 0.0001–0.2 parts by weight of a zero valent platinum-phosphorus complex to 100 parts by weight of polyorganosiloxane containing a vinyl group is desirable. Smaller amounts slow the curing speed and make it vulnerable to inhibiting substances such as sulfur compounds. An excess amount lowers the heat resistance of the silicone rubber obtained.

The catalytic composition of this invention does not react at room temperature since its component, zero valent platinum-phosphorus complex, is stabilized. When the catalyst is added to addition-reaction type polysiloxane compositions, the resulting composition is far more stable at room temperature than those using other patinum group catalysts, and, also, has good curing properties when heated. There is no problem of variance in reactivity and stability by the addition of an inhibitor as was the case in the conventional method where an inhibitor was used concurrently with the platinum catalyst. The catalytic composition of this invention is used as a catalyst for a hydrosilylation reaction of polyorganosiloxanes that are particularly stable for long periods of time at room temperature, but, in addition, cure rapidly by heating the components.

Examples of this invention are cited below. In each example, "part" refers to "parts by weight".

EXAMPLE 1

A silicone rubber compound is prepared by mixing the following ingredients in a dough mixer; (a) 100 parts trimethylsilyl group end-blocked polyorganosiloxane (a polymerization degree of about 6,000) which is composed of 99.8 mole percent of dimethylsiloxy units and 0.2 mole percent of methylvinylsiloxy units, (b) 40 parts fumed silica; (c) 2 parts polyorganosiloxanediol a viscosity of 50 centistokes at 25° C. which is composed of 70 mole percent of dimethylsiloxy units and 30 mole percent of diphenylsiloxy units. With this, 0.5 parts trimethylsiloxy group endblocked poly(methylhydrogen) siloxane (a polymerization degree of 30) are mixed as a crosslinking agent. The samples are prepared by adding a hydrosilylating catalyst and stannous salt as shown in Table 1 to the addition-reaction type polyorganosiloxane obtained as described above. The change in the degree of plasticity is determined after allowing the compositions to stand at room temperatures. The results show gelation takes place within 1 to 5 days in all the compositions used for comparison. In table 1, the sample 13, 14 and 15 are the compositions used for comparison.

TABLE 1

| Sample No. | 11 | 12 | 13 | 14 | 15 |
|---|---|---|---|---|---|
| Catalytic Ingredients (Parts) | | | | | |
| [(C$_6$H$_5$O)$_3$P]$_4$Pt | 0.01 | 0.01 | 0.01 | — | — |
| H$_2$PtCl$_6$ . 6H$_2$O | — | — | — | 0.01 | 0.01 |
| SnCl$_2$ . 2H$_2$O | 0.006 | — | — | — | 0.015 |
| Sn(OCOC$_{17}$H$_{33}$)$_2$ | — | 0.01 | — | — | — |
| Dioxane | 0.15 | 0.15 | — | — | — |
| Plasticity Degree (Williams) | | | | | |
| After 1 hour | 280 | 280 | 280 | 270 | 280 |
| After 1 day | 280 | 280 | 300 | Gelation | 330 |
| After 2 days | 280 | 280 | 330 | Gelation | 420 |
| After 3 days | 285 | 280 | 400 | Gelation | Gelation |
| After 5 days | 290 | 290 | Gelation | Gelation | Gelation |
| After 7 days | 290 | 295 | Gelation | Gelation | Gelation |

Sample 11 in Table 1 was allowed to stand respectively for 1 hour and 7 days at room temperatures after mixing and was freshened with a 2-roll mill and press vulcanized under a pressure of 30 kg/cm$^2$ at 180° C. for 10 minutes. All the resulting silicone rubbers show good elasticity.

EXAMPLE 2

Catalytic Compositions A. which are also designated as Catalyst 21, are prepared by dissolving 0.3 parts of [(C$_6$H$_5$)$_3$P]$_4$Pt and 0.1 parts of SnCl$_2$.2H$_2$O to 50 parts of dioxane. As a comparison, the Composition B. (catalyst 22) is prepared in the same manner but SnCl$_2$.2H$_2$O is eliminated from the above. Each Composition is sealed and stored in a constant temperature oven at 50° C. for a maximum of 30 days. 0.5 parts of catalysts are taken immediately after the preparation and after storing respectively, and the degree of plasticity is determined immediately after adding them with a 2-roll mill to 100 parts of addition-reaction type polyorganosiloxane compositions of Example 1. Physical properties of silicone rubber obtained by press vulcanization under pressure of 30 kg/cm² at 180° C. for 10 minutes are also determined. The results are summarized in Table 2. Catalyst 21 is easy to handle with good plasticity after being aged for 30 days, and the physical properties of silicone rubber obtained do not differ from those using a catalyst that has been freshly prepared. When catalyst 22, the catalyst for comparison, is left at 50° C. for 10 days and, then, added to addition-reaction type polyorganosiloxane, on the other hand, gelation of the polysiloxane composition starts on the roller, and freshening cannot be continued.

TABLE 2

| | Catalyst 21 | | | | | | Comparative example 22 | | | |
|---|---|---|---|---|---|---|---|---|---|---|
| Number of days catalyst is kept | 0 | 5 | 7 | 10 | 15 | 30 | 0 | 5 | 7 | 10 |
| Degree of Plasticity (Williams) | 280 | 280 | 290 | 290 | 300 | 290 | 280 | 300 | 350 | gelation |
| Hardness | 60 | 61 | 60 | 61 | 62 | 60 | 60 | 62 | 61 | freshening |
| Tensile strength (kg/cm²) | 100 | 102 | 99 | 104 | 103 | 102 | 102 | 100 | 101 | impossible |
| Elongation (%) | 400 | 410 | 400 | 400 | 390 | 410 | 410 | 420 | 410 | |

TABLE 4

| Sample No. | 41 | 42 | 43 | 44 | 45 |
|---|---|---|---|---|---|
| Catalytic Composition Ingredients (parts) | | | | | |
| [(p-Cl-C$_6$H$_4$)$_3$P]$_4$Pt | 0.01 | — | — | — | — |
| [(C$_4$H$_9$O)$_3$P]$_4$Pt | — | 0.01 | 0.02 | — | — |
| [(C$_2$H$_5$O)$_2$(C$_6$H$_5$O)P]$_4$Pt | — | — | — | 0.006 | 0.01 |
| SnCl$_2$ . 2H$_2$O | 0.005 | 0.01 | — | 0.005 | — |
| Stannous Maleate | — | — | 0.01 | — | 0.015 |
| Dioxane | — | 20 | — | — | — |
| Anisole | — | — | — | 20 | — |
| Plasticity Degree (Williams) | | | | | |
| After 1 hour | 280 | 280 | 280 | 280 | 280 |
| After 7 days | 300 | 290 | 295 | 280 | 285 |

EXAMPLE 3

A silicone rubber compound is obtained by mixing the following substances in a kneader: (a) 100 parts of trimethylsilyl-group-end-blocked polyorganosiloxane (a polymerization degree of about 6,000) which is composed of 99.9 mole % of dimethylsiloxy units and 0.1 mole % of methylvinylsiloxy units; (b) 40 parts of fumed silica; and (c) 2 parts of methoxy-group-endblocked polyorganosiloxane with viscosity at 25° C. of 40 centistokes which is composed of 67 mole % of dimethysiloxy units; and 33 mole % of diphenylsiloxy units. Samples 31–36 are prepared as follows: the above silicone rubber compound is rolled by 2-roll mill; to this, 0.6 parts of trimethylsilyl-group-endblocked poly(methylhydrogen) siloxane with a polymerization degree of 30, 0.01 parts of [(C$_6$H$_5$O)$_3$P]Pt, and SnCl$_2$.2H$_2$O in the quantity indicated in Table 3 are added; they are freshened and mixed thoroughly by a 2-roll mill. The curing time determined for each sample at 170° C. by curastometer are shown in Table 3. For comparison, a sample to which SnCl$_2$.2H$_2$O is not added, (comparative sample 37), and a sample whose platinum compound has been changed to 0.01 parts of H$_2$PtCl$_6$.2H$_2$O, and to which 0.01 parts of SnCl$_2$.2H$_2$O have been added (comparative sample 38) are prepared; but both samples start gelation during freshening which makes the use of a curestometer impossible.

TABLE 3

| Sample No. | 31 | 32 | 33 | 34 | 35 | 36 |
|---|---|---|---|---|---|---|
| SnCl$_2$ . 2H$_2$O (parts) | 0.001 | 0.003 | 0.005 | 0.01 | 0.02 | 0.04 |
| Curing Time (min) | 5 | 9 | 12 | 15 | 18 | 25 |

EXAMPLE 4

Samples 41–45 are prepared by adding the catalyst compositions indicated in Table 4 to addition-reaction type polysiloxane compositions obtained in Example 1. Each sample maintains the kind of plasticity indicated in Table 4 even after being left at room temperature for 7 days, and results in good silicone rubber when press vulcanized under the same conditions as in Example 1.

EXAMPLE 5

The catalytic composition obtained by mixing 0.02 parts of [(C$_6$H$_5$)$_3$P]$_4$Pt, 0.015 parts of stanous octylate, and 5 parts of ethylene glycol dimethyl ether as a solvent was added to the solution obtained by mixing 86 parts of 1,3,5,7-tetravinyl-1,3,5,7-tetramethylcyclo-tetrasiloxane, and 33.5 parts of 1,1,3,5,5,7-hexamethyl-3,7-dihydrocyclo-tetrasiloxane, and mixed uniformly. The liquid substance thus obtained is left at 35° C. for 3 days, but no particular change in viscosity is observed. A transparent resin-like substance is formed when this liquid substance is poured between two glass plates with a space of 2 mm and left for 3 hours after a gradually increasing the temperature so that it reaches 100° C.

We claim:

1. A silicone composition which is capable of being vulcanized at room temperature or at elevated temperatures comprising: (a) 100 parts by weight of a vinyl-containing diorganopolysiloxane polymer having a polymerization degree varying from 100 to 10,000 at 25° C. and a viscosity of from 500 centipoise to 300,000,000 centipoise at 25° C. where the organo groups other than vinyl are selected from the class consisting of monovalent hydrocarbon radicals and halogenated monovalent hydrocarbon radicals; (b) a silicon-bonded-hydrogen containing polysiloxane having a viscosity varying anywhere from 5 to 5,000 centipoise at 25° C., and where the organo groups in such hydrogen containing polysiloxane are selected from the class consisting of monovalent hydrocarbon radicals and halogenated monovalent hydrocarbon radicals; (c) from 0.0001 to 0.2 parts by weight of a zero valent platinum-phosphorus complex having the formula (R$^1$R$^2$R$^3$P)$_4$Pt wherein R$^1$, R$^2$ and R$^3$ are identical or different groups selected from the class consisting of monovalent hydrocarbon radicals and monovalent hydrocarbonoxy radicals and mixture thereof, and from 0.1 to 20 parts by weight of a stannous salt selected from the group consisting of stannous halides and stannous carboxylates per one part by weight of the zero valent platinum-phosphorus complex.

2. The composition of claim 1 where in the phosphorus platinum complex each R$^1$, R$^2$ and R$^3$ are monovalent hydrocarbon radicals selected from the class consisting of phenyl radicals and phenoxy radicals and mixtures thereof.

3. The composition of claim 1 wherein the stannous salt in (c) is selected from the class consisting of hydrates of stannous chloride, hydrates of stannous bromide, stannous octoate, stannous oleate, and stannous maleate.

4. A process for preparing and curing a silicone composition which is inhibited at room temperature cut cures rapidly at elevated temperatures comprising; (1) mixing (a) 100 parts by weight of a vinyl-containing diorganopolysiloxane polymer having a viscosity varying from 500 centipoise to 300,000,000 centipoise at 25° C., where the organo groups other than vinyl are selected from the group consisting of monovalent hydrocarbon radicals and halogenated monovalent hydrocarbon radicals; (b) a silicon-bonded-hydrogen containing polysiloxane having a viscosity varying from 5 to 5,000 centipoise at 25° C., where the organo groups in the polysiloxane is selected from monovalent hydrocarbon radicals and halogenated monovalent radicals, and (c) from 0.0001 to 0.2 parts by weight of a zero valent platinum-phosphorus complex having formula $(R^1R^2R^3P)_4Pt$ wherein $R^1$, $R^2$ and $R^3$ are identical or different groups selected from the class consisting of monovalent hydrocarbon radicals and monovalent hydrocarbonoxy radicals and mixtures thereof and from 0.1 to 20 parts by weight of a stannous salt selected from the group consisting of stanous halides and stannous carboxylates per one part by weight of the zero valent platinum-phosphorus complex; (2) allowing the composition to cure to a silicone elastomer.

5. The process of claim 4 wherein in the platinum phosphorus complex $R^1$, $R^2$ and $R^3$ are each selected from the class consisting of phenyl radicals and mixtures thereof.

6. The process of claim 4 wherein the stannous salt is selected from the class consisting of hydrates of stannous chloride, hydrates of stannous bromide, stannous octoate, stannous oleate, and stannous maleate.

* * * * *